Aug. 7, 1956  R. F. WILLIAMS  2,757,431
MOLD BOX
Filed Nov. 17, 1953  2 Sheets-Sheet 1
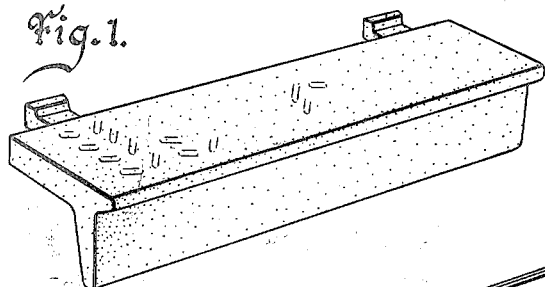
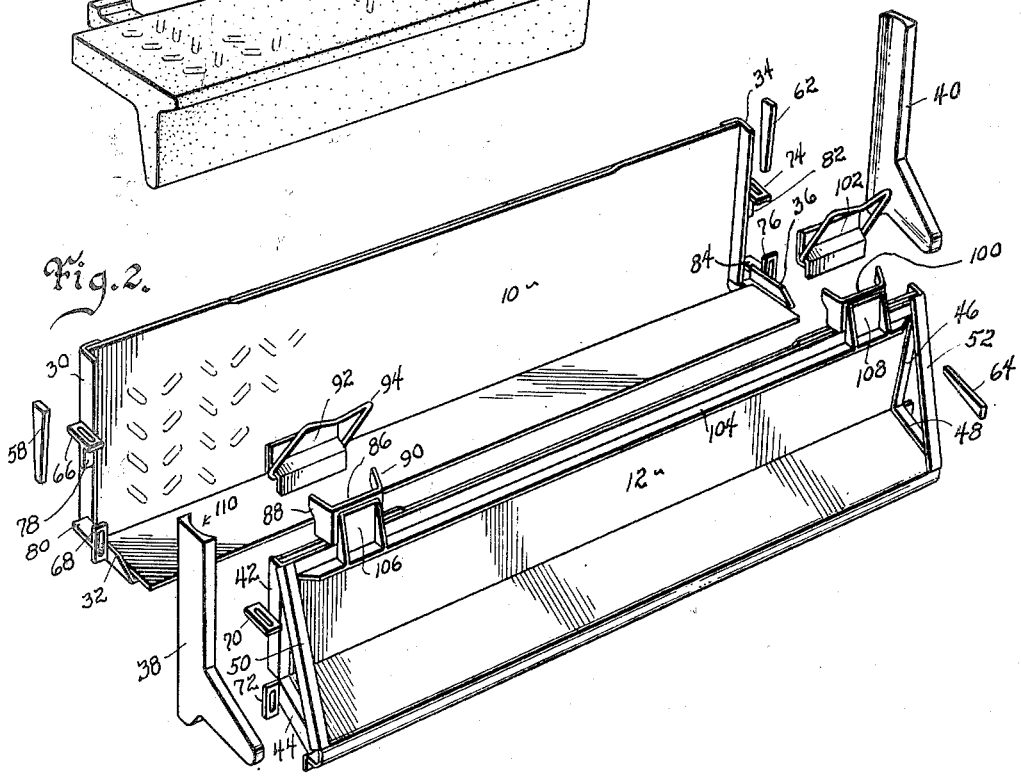
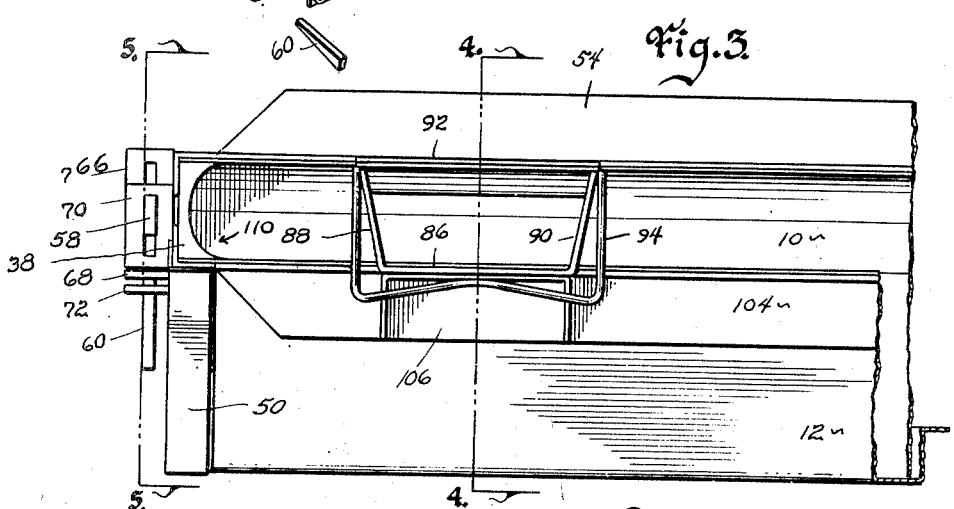
Witness
Edward P. Seeley
Inventor: Roger F. Williams
by Talbert Dick & Adler
Attorneys Aug. 7, 1956
R. F. WILLIAMS
2,757,431
MOLD BOX
Filed Nov. 17, 1953
2 Sheets-Sheet 2
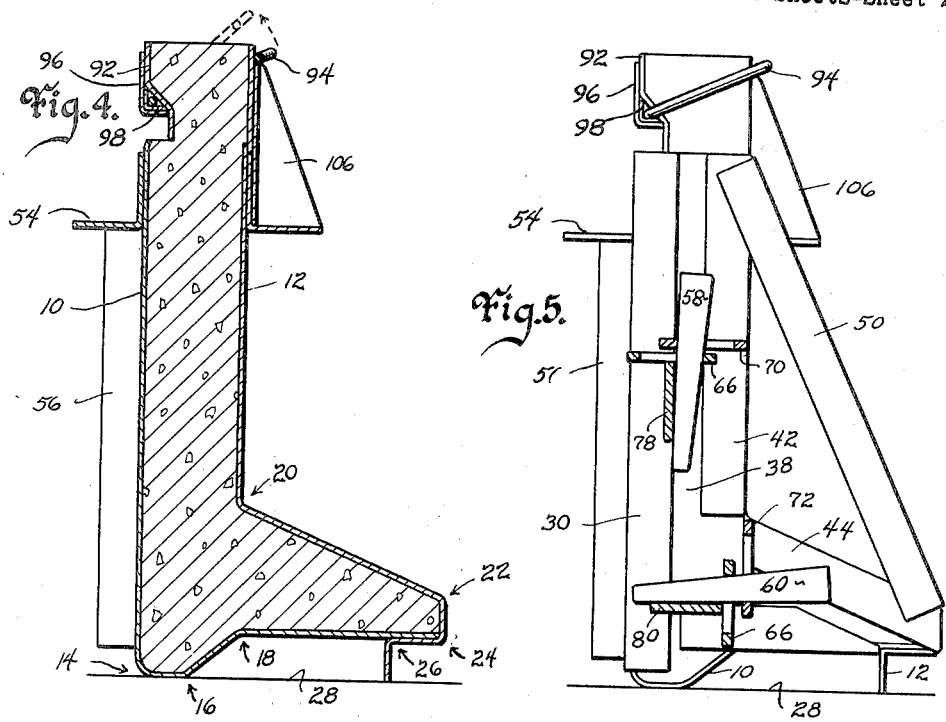
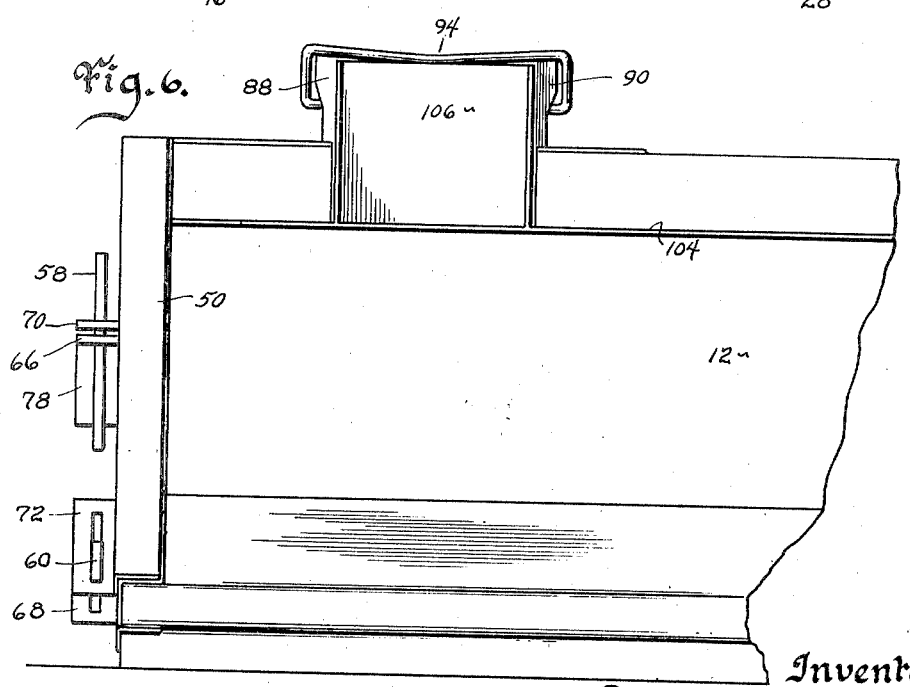
Witness
Edward P. Seeley
Inventor
Roger F. Williams
by Talbert Dick Adler
Attorneys

United States Patent Office 2,757,431
Patented Aug. 7, 1956

2,757,431

MOLD BOX

Roger F. Williams, Des Moines, Iowa

Application November 17, 1953, Serial No. 392,536

8 Claims. (Cl. 25—118)

My invention relates to the art of molding and specifically I have invented a mold box that has novel component parts and structure for securing them together.

It is the principal object of my invention to provide a mold box that is rapidly and easily assembled and disassembled.

It is a further object of my invention to provide a mold box that forms a product having exposed edges that are rounded.

It is a further object of my invention to provide a mold box that is easily cleaned.

It is a still further object of my invention to provide a mold box that is economical to manufacture, durable in use, and refined in appearance.

These and other objects will be apparent to those skilled in the art.

My invention consists in the construction, arrangement and combination of the various parts of the device, whereby the objects contemplated are attained as hereinafter more fully set forth, and specifically pointed out in my claims and illustrated in the accompanying drawings, in which:

Fig. 1 is a reduced perspective view of the product of the particular mold box used for illustrative purposes, Fig. 2 is an exploded perspective view of my mold box, Fig. 3 is an enlarged fragmentary plan view of my mold box, Fig. 4 is an enlarged vertical sectional view of my mold box taken on the line 4—4 of Fig. 3 and with broken lines illustrating an adjusted position of the lock ring, Fig. 5 is an enlarged end elevation view of my mold box and vertical sectional view of the wedge securing structure taken on the line 5—5 of Fig. 3, and Fig. 6 is an enlarged fragmentary side elevation view of my mold box.

Referring to the drawings I have used the numeral 10 to designate one of the L-shaped mold box side portions. I have labeled this side portion as the outside L-shaped side portion because it forms that portion of the mold box which determines the shape of the L-shaped product that is farthest from the area partially enclosed by the L of the finished product. The numeral 12 I have used to designate the L-shaped side portion which I call the inside L-shaped side portion since it determines the shape of the inside of the L. Both of these side portions are formed from sheet metal or some other sheet material which may be formed into a shape which will then be retained. The outside portion extends straight for a majority of its width and then curves to form a small portion that is at right angles to the major portion of the sheet.

The point at which this curving bend occurs is designated in Fig. 4 by the numeral 14. At the bend point designated 16 in the same figure the sheet is then extended upwardly and away from the major portion of the sheet for a short distance. At a second bend point designated 18, the sheet is again bent to extend vertically away from the majority of this side piece 10. The entire distance from the curving bend 14 past both the bend points 16 and 18 and to the free end of a smaller portion of the sheet is referred to as the short portion of this side member in contrast to the longer vertical portion. The inside L-shaped side member designated generally by 12 also extends straight down for a considerable portion of its height and then is bent outwardly and downwardly to a bend point 20 to a second bend point designated 22. From the bend point 22 the sheet extends straight down a short distance and is then bent back upon itself to form channel that extends the entire length of the side piece. This third bend point is designated 24. The free end of this side member is bent straight downwardly from the bend point 26 and extends straight down a vertical distance equal to the difference in heights of the bend point 18 as compared to the bend point 16. Thus when the mold box is positioned on a horizontal surface such as the one designated 28, the free end of said member 12 forms one leg while the portion of the side member 10 between bend points 14 and 16 forms another leg on which the entire mold box is supported in a vertical position. The side member 10 is equipped with flanges on both the large and small portions of it and at both ends. These flanges may be formed from angle iron or other suitable material and they are designated by the numerals 30, 32, 34 and 36 respectively. These flanges serve a dual purpose of strengthening the ends of the side pieces and also serve as retaining flanges for the cast end pieces 38 and 40. The side piece 12 is similarly equipped with flanges 42, 44, 46, and 48 respectively. Angular braces 50 and 52 on the side piece 12 further strengthen and support it against the weight of the material to be molded. The side piece 10 is further reenforced by the longitudinal rib 54 and vertical ribs such as the one designated 56.

The two side pieces of the mold are secured together, when the mold is assembled for its intended purpose, by means of the wedges 58, 60, 62 and 64. These wedges are inserted into the loops secured to the end flanges and designated by the numerals 66, 68, 70, 72, 74 and 76 and similar loops on the other end of side member 12, but not clearly visible in any of the drawings. These loops are so positioned that when the free end of the short portion of the outside L-shaped side member is inserted into the channel as far as it can be shown in Fig. 4. The loops are positioned adjacent to each other and overlapping each other forming overlapping pairs. In order to provide better securing action as the wedges are inserted in the loop, the leverage members or plates designated 78, 80, 82 and 84 are secured to at least one of each of said pairs of overlapping loops. I have shown all of these leverage plates as being secured to the outside L-shaped side member. This is not necessary however and it would be possible to secure the leverage plates to either loop of any one pair. It is essential, however, if this leverage member structure is to be used, that the leverage plate be secured to at least one member of each pair, and, furthermore, it must be secured to the loop or adjacent to it at a point that is spaced from the overlapping loop end. The purpose of the leverage plate is to prevent the wedge from turning as a result of pressure exerted on the wedge by the two loops. By using this lever plate technique it is not essential to have the loops align precisely.

At the top of the mold box and in this case secured to the inside L-shaped side member are the locking lug forming portions of the mold box. These locking lug portions are formed by bending a plate or sheet of material so that it has a central portion and two outwardly diverging wings one on each end. There are two of these units secured to the mold box illustrated, but this number is merely the minimum practical number for the particular unit being cast and might be increased or decreased if this structure is used on other molds. The central portion of one of these units is designated 86 and the wings designated 88 and 90 respectively. It will be noticed that the lower portions of each wing are cut away and that the plate member designated 92 which has a double bend in it causing it to conform nicely to the shape of the outer ends of the wings. This structure is shown clearly in Fig. 5. A locking ring or loop 94 is hingedly secured to plate 92 by any suitable manner and in this case it has been accomplished by merely securing a second plate 96 to the double bend plate 92 and causing this second plate 96 to form a right angle positioned opposite to the slanting portion of the double plate. Although not essential, I have found it convenient to insert a small right angle element 98 inside the triangle formed by the plate 96 and the slanting portion of plate 92. The purpose of this small plate is to reduce the size opening into which the lock wire is inserted. A second plate wing member generally designated 100 and having the secondary double bend plate 102 is formed in exactly the same manner as plates 86 and 92. A detailed description of this second locking lug portion of the mold box is deemed unnecessary. Both of the locking lug portions are secured to and supported by the inside L-shaped side member 12. A longitudinally arranged reenforcing rib 104 with locking lug reenforcing units 106 and 108 respectively are secured to and reenforce the top edge of side member 12 and secure the locking lug forming portions to the side member. As is disclosed in Fig. 4, the support members 106 and 108 also serve as stops which prevent the lock rings or loops from being improperly positioned by limiting the movement of these rings in a downward direction over the plates 86 and 100. It is also important to notice that the end pieces 38 and 40, because they are castings, can be provided with a rounded interior form as indicated at 110 which causes the end product, although cast in a mold formed primarily from sheet material, to have smoothly rounded edges at both ends and along the top from which are the exposed portions of the finished product. The top front rounding edge is formed by the curved bend 14. This technique of using small cast portions to provide rounded edges in molds formed primarily from sheet material is useful and desirable.

The operation of my device is almost self-evident. The assembly of the mold most easily is accomplished if the side members are arranged as shown in Fig. 2. The two end members are moved into position on the outside side member 10 and the two side members advanced toward each other. Care must be exercised to make sure that the free end of the short portion of side 10 enters the channel of side 12 as shown in Fig. 4. As shown in Fig. 5, the loops then overlap enough to permit the wedges to be inserted and driven home to draw together tightly the side portions of the mold. As the sides are drawn together with considerable force, the ends 38 and 40 are secured frictionally in the mold box and clamped therein. The plates 92 and 102 are brought into contact with their respective locking lug forming elements and secured there with the lock rings 94 and the corresponding element on plate 102. The mold box is then ready to be poured full of a Portland cement and aggregate mixture of suitable properties. Once the aggregate has hardened the mold is readily disassembled by merely knocking out the wedges and slipping the lock rings free from the plates. When the form is disassembled, it is readily cleaned in any conventional manner.

It is submitted that the invention shown and described is aptly suited to achieve the purposes intended and is characterized by a combination of highly useful and mutually cooperating elements that combine their respective and proportionate functions in accomplishing the objects sought to be obained.

Some changes may be made in the construction and arrangement of my mold box without departing from the real spirit and purpose of my invention, and it is my intention to cover by my claims, any modified forms of structure or use of mechanical equivalents which may be reasonably included within their scope.

I claim:

1. In a mold box, an outside L-shaped side member, a complementary inside L-shaped side member; said inside L-shaped side member having a lower portion of it bent back upon itself, flanges secured to the ends of said outside L-shaped side member extending toward the inside of its L-shape, flanges secured to said inside L-shaped side member extending toward the outside of its L-shape, L-shaped end members having the inside shape of said inside L-shaped side member and the outside shape of said outside L-shaped side member; a pair of loops disposed at right angles to each other and secured to the flanges of each end of each L-shaped side member; loops secured to corresponding portions of each of said L-shaped side members being arranged to have at least portions of said corresponding loop overlap to form overlapping pairs, a leverage member rigidly secured to one of each of said pairs of overlapping loops on the side of said loop opposite to that on which it is overlapped by the other loop of each pair of loops, and wedges adapted for selective insertion through and removal from pairs of overlapping loops.

2. The mold box of claim 1 further characterized by having at least one locking lug forming portion secured to said inside L-shaped side member and said locking lug forming portion consisting of a plate having wings extending diagonally from both sides thereof; said wings being cut back at their lower outer ends, a plate bent to fit the outer ends of said wings, a locking loop hingedly secured to said bent plate, and a means secured to said winged plate for securing it to said inside L-shaped member; said securing means also serving as a stop for said locking loop of said bent plate to limit downward hinging movement of said locking loop relative to said winged plate.

3. In a mold, a sheet of material having at least one bend in it; whereby a smaller portion of said sheet extends at substantially right angles to a larger portion of said sheet, a second sheet of material having at least one bend in it; whereby a smaller portion of said second sheet extends at right angles to a larger portion of said second sheet, a pair of loops disposed at right angles to each other and secured to both ends of both portions of said sheet, a pair of loops disposed at right angles to each other and secured to both ends of both portions of said second sheet, leverage members secured to the loops on one of said sheets, end pieces having outside shapes that correspond to the shape defined by said sheet and second sheet when they are arranged with the smaller portion of one of said sheets resting on the smaller portion of the other of said sheets; said loops on corresponding portions and ends overlapping each other, and wedges selectively insertable through overlapping loops and removable therefrom to detachably secure said sheets against movement relative to each other.

4. The mold box of claim 3 further characterized by having at least one locking lug forming portion secured to said inside L-shaped side member and said locking lug forming portion consisting of a plate having wings extending diagonally from both sides thereof; said wings being cut back at their lower outer ends, a plate bent to fit the outer ends of said wings, a locking loop hingedly secured to said bent plate, and a means secured to said winged plate for securing it to said inside L-shaped member; said securing means also serving as a stop for said locking loop of said bent plate to limit downward hinging movement of said locking loop relative to said winged plate.

5. The mold box of claim 1 further characterized by having said L-shaped end members being of substantial thickness and having at least one side of each formed in a smoothly rounded concave depression curving up from a low portion throughout its L-shape to sharp edges.

6. In a mold box, an outside side member of predetermined shape, an inside side member having a shape complementary to said outside side member, flanges secured to the ends of said side portions and extending towards the inside of said outside side member and towards the outside of said inside side member, end members having the inside shape of said outside side member and the outside shape of said inside side member, a pair of loops disposed at right angles to each other and secured to the flanges of each end of each side member, loops secured to corresponding portions of each of said side members being arranged to have at least portions of said corresponding loop overlap to form overlapping pairs, a leverage member rigidly secured to one of each of said overlapping loops forming a pair and extending away from the adjacent overlapping surfaces of the two loops forming the pair, and wedges selectively insertable in and removable from said overlapping pairs of loops.

7. The mold box of claim 6 further characterized by having at least one locking lug forming portion secured to said inside side member and said locking lug forming portion consisting of a plate having wings extending diagonally from both sides thereof; said wings being cut back at their lower outer ends, a plate bent to fit the outer ends of said wings, a locking loop hingedly secured to said bent plate, and a means secured to said winged plate for securing it to said inside side member; said securing means also serving as a stop for said locking loop of said bent plate to limit downward hinging movement of said locking loop relative to said winged plate.

8. In a mold box having two half members of predetermined shape, said half members adapted to be joined together to form an enclosed volume, pairs of loops disposed at right angles to each other at intervals on the edges of each of said half members, said pairs of loops on the edge of each half member adapted to form overlapping pairs of loops with the pairs of loops on the edge of said other half member when said half members are joined together, a leverage member rigidly secured to one of each of said overlapping loops forming a pair and extending away from the adjacent overlapping surfaces of the two loops forming the pair, and wedges selectively insertable in and removable from said overlapping pairs of loops.

References Cited in the file of this patent

UNITED STATES PATENTS

| 1,527,698 | Pearthee | Feb. 24, 1925 |
| 1,547,036 | Hedrick | July 21, 1925 |
| 1,756,473 | Rauber | Apr. 29, 1930 |
| 1,984,087 | Scheel | Dec. 11, 1934 |
| 2,626,444 | Wolf et al. | Jan. 27, 1953 |